US006515732B1

(12) United States Patent
Fant et al.

(10) Patent No.: US 6,515,732 B1
(45) Date of Patent: Feb. 4, 2003

(54) PHOTOFINISHING METHOD AND SYSTEM

(75) Inventors: Alfred B. Fant, Rochester, NY (US); Peter Vanderbrook, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 132 days.

(21) Appl. No.: 09/603,276

(22) Filed: Jun. 26, 2000

(51) Int. Cl.[7] ................................................ G03B 27/52

(52) U.S. Cl. ........................... 355/40; 396/567; 355/41; 355/77

(58) Field of Search ............................. 355/40, 41, 77, 355/27–29; 396/567–570

(56) References Cited

U.S. PATENT DOCUMENTS

| | | | | |
|---|---|---|---|---|
| 5,032,707 A | | 7/1991 | Gudmundson et al. | 355/40 |
| 5,159,385 A | | 10/1992 | Imamura | 355/40 |
| 5,426,481 A | * | 6/1995 | Slater et al. | 355/40 |
| 5,745,219 A | * | 4/1998 | DeMarti et al. | 355/40 |
| 5,761,558 A | | 6/1998 | Patton et al. | 396/512 |
| 6,055,037 A | * | 4/2000 | Miyawaki | 355/40 |

FOREIGN PATENT DOCUMENTS

| | | |
|---|---|---|
| EP | 0 458 747 A1 | 5/1991 |
| EP | 0 890 877 A2 | 1/1999 |

* cited by examiner

*Primary Examiner*—D. Rutledge
(74) *Attorney, Agent, or Firm*—Thomas H. Close

(57) ABSTRACT

A method and system for photofinishing, includes generating a unique roll ID number for a roll of photographic film to be finished; recording customer order information for the roll of film; associating the customer order information with the unique roll ID number in a central computer facility; marking the roll of film with a machine readable version of the unique roll ID number; and reading the roll ID number on the roll of film, and accessing the customer order information from the central computer facility to control a photo finishing operation, whereby the roll of film can be transported to a photofinishing laboratory without the use of an envelope bearing customer order information.

27 Claims, 4 Drawing Sheets

| PART 1 (DEALER ID) | PART 2 (SEQUENCE NO.) |
|---|---|
| 101<br>101<br>101<br>.<br>.<br>101 | 0001<br>0002<br>0003<br>.<br>.<br>9999 |
| 102<br>.<br>.<br>.<br>.<br>.<br>102 | 0001<br>.<br>.<br>.<br>.<br>.<br>9999 |
| .<br>.<br>.<br>. | |
| 999<br>.<br>.<br>.<br>999 | 0001<br>.<br>.<br>.<br>9999 |

64 66

PHOTOFINISHING METHOD AND SYSTEM

FIELD OF THE INVENTION

The present invention relates to photofinishing methods and systems, and more particularly to methods and systems of controlling orders in a wholesale photofinishing operation.

BACKGROUND OF THE INVENTION

In conventional wholesale photofinishing laboratories, customer rolls of film arrive in envelopes from retail dealers containing owner's name and instructions for developing, and the details of the photographic output desired. The individual dealer-designed envelopes used to transport film are of a common size, however, most are unique, with different locations on the envelope for instructions and information. Consequently some instructions are missed and some are misinterpreted. In addition, because the envelope contains owner information, it must be maintained in the same order as the films throughout the photofinishing steps in order to return the film and prints to the proper owner. What is desired is a method to eliminate the need for envelopes within the photofinishing laboratory, while insuring that customer instructions are followed and the customer receives their original film order.

The Advanced Photographic System provides a number imprinted on the film cassette (called a Cassette ID or CID) and the same number exposed on the film (called a Film ID or FID), so that after processing, the film and cassette may be reunited. However, customer identification and order information are not associated with this number, nor is the CID necessarily unique within a photofinishing laboratory. That is, within a given laboratory on a single night, there may be several pairs of Advanced Photographic System films with the same FID or CID.

There is a need therefore for an improved method of photofinishing that avoids the problems noted above.

SUMMARY OF THE INVENTION

The need is met according to the present invention by providing a method and system for photofinishing, that includes generating a unique roll ID number for a roll of photographic film to be finished; recording customer order information for the roll of film; associating the customer order information with the unique roll ID number in a central computer facility; marking the roll of film with a machine readable version of the unique roll ID number; and reading the roll ID number on the roll of film, and accessing the customer order information from the central computer facility to control a photofinishing operation, whereby the roll of film can be transported to a photofinishing laboratory without the use of an envelope bearing customer order information.

ADVANTAGES

The present invention provides for a means of associating the customer roll of film with the customer name and the customer instructions for the photofinishing of the roll of film. It provides a means of automated handling of rolls of film within a photofinishing laboratory, and eliminates the need for the retail bags to identify rolls of films.

DETAILED DESCRIPTION OF THE INVENTION

Figure 1:
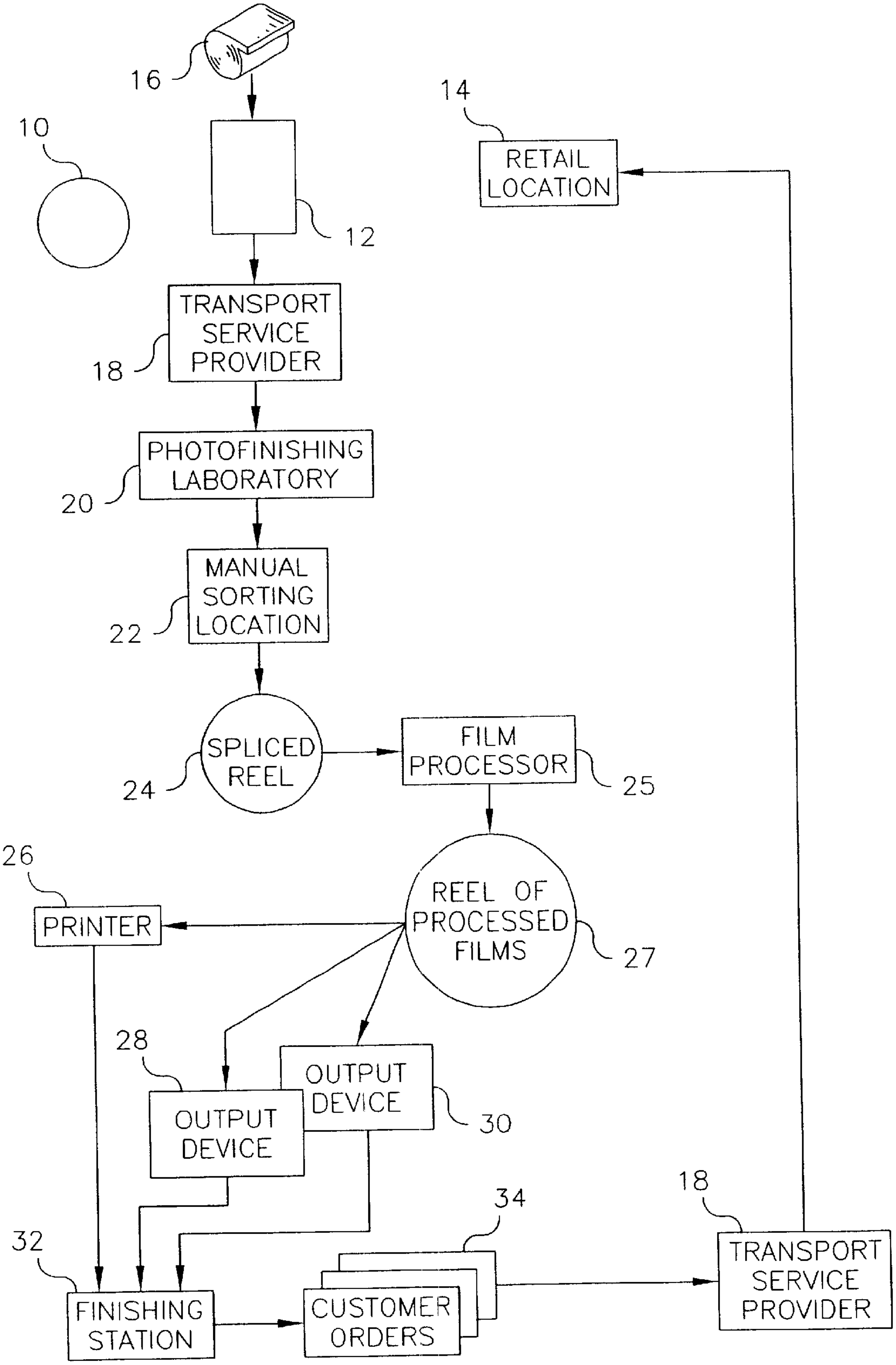
FIG. 1 (PRIOR ART)
FIG. 1 is a block diagram showing a typical retail-wholesale photofinishing operation.

FIG. 1 shows the traditional wholesale photofinishing laboratory schematic, showing the photographer (or customer) 10 filling out an envelope 12 at a retail location 14. The envelope 12 contains customer identification and the specific services requested that the laboratory perform on the roll of film 16. The film 16 is deposited into the envelope 12. The retail dealer sites are numerous; one is shown for simplicity. At an established frequency, a transport service provider 18 will collect the customer envelopes 12 and transport them to the photofinishing laboratory 20 to perform the requested services on the films contained therein.

Within the photofinishing laboratory 20, a sorting operation is conducted on the envelopes 12. Customer films with the same services requested are grouped, or batched together for processing and output services requested at a manual sorting location 22. Typical output services would include size of print, number of prints, surface texture of print or electronic storage of digitized scan of the image. In addition, other output services might include placement of the image onto a non-traditional surface such as a piece of clothing, a keychain or any desired item. Once batched, the customer films are removed from the envelope, spliced together in a reel 24 and processed in a film processor 25 to produced rolls of processed film 27. The envelopes 12 are maintained in the same order sequence as the spliced customer rolls of film to permit return to the owner. To facilitate maintaining the sequence, an auxiliary common number may be placed on the envelope and splice tape attaching the film to the reel of other customer rolls. The reel of processed customer films 27 is manually transported to a printer 26 or other output devices 28, 30 (such as a film scanner to produce digital images, or an enlarging printer to produce large prints) to provide the customer services requested. When all services are available, the services, the processed films 24 and the order envelopes 12 are matched at a finishing station 32, where the requested services are reunited with the envelopes 12. Once the requested services are completed, the customer order 34 associated with envelope 12 is returned to the dealer site 14, usually by the same transport provider 18.

Figure 2:
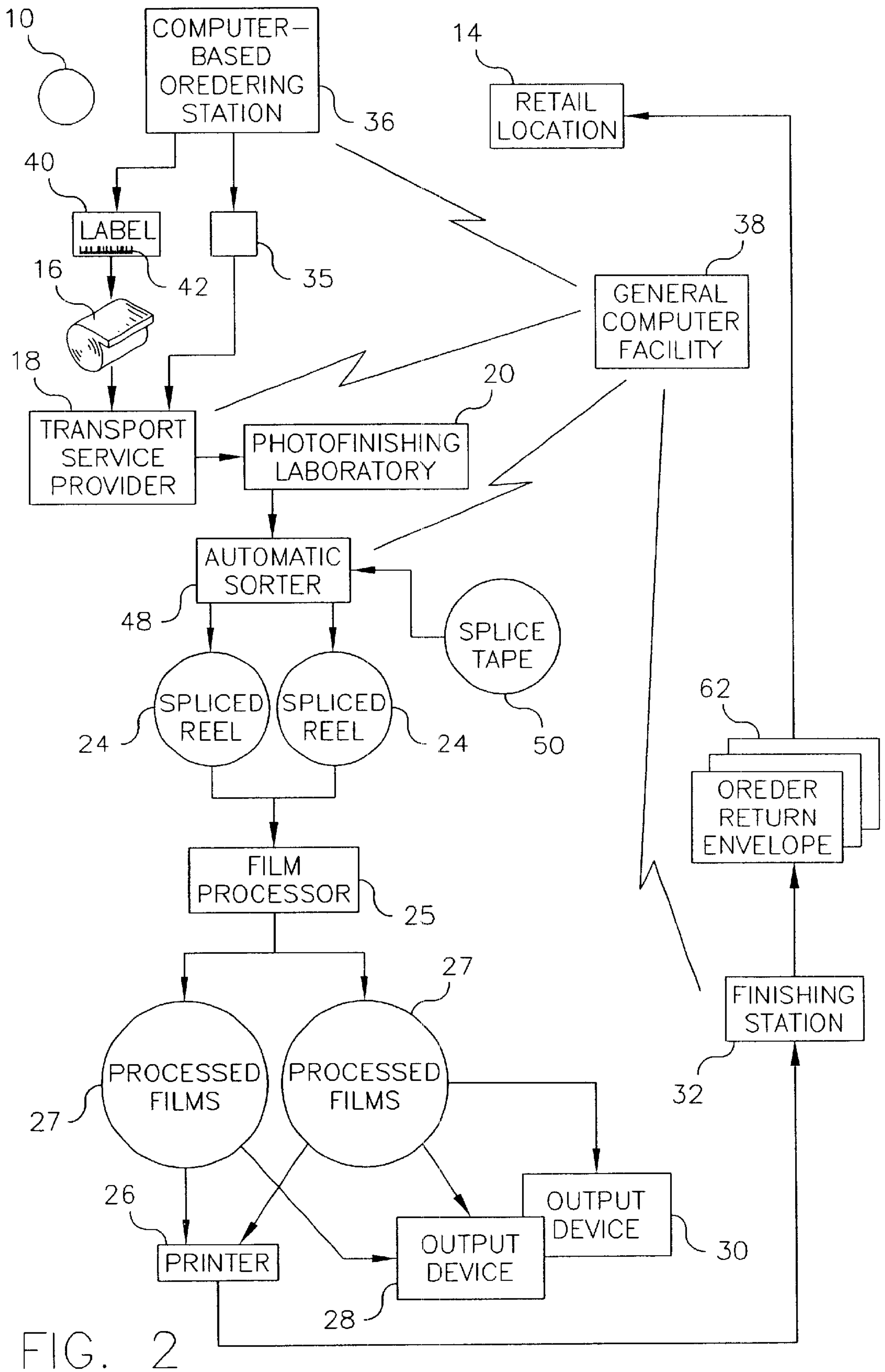
FIG. 2 As a flow chart describing the method and system of the present invention.

FIG. 2 shows the flow of one embodiment of the present invention. In this embodiment, the customer 10 enters the requested photofinishing services and customer information into a computer-based ordering station 36 at a retail location 14. The customer-entered data is either stored on a portable storage medium, such as a diskette or tape 35, or other suitable recording media, or electronically transmitted to a central computer facility 38. The central computer facility 38 includes at least one computer accessible from a remote location, for example via the internet. The retail location computer ordering station generates a label 40, containing a machine readable roll identification number 42, which the customer affixes to the roll of film 16. In another embodiment of the invention, the computer-based ordering station 36 applies the label 40 directly to the film cassette 16. In a third embodiment of the invention, the roll identification number is written on the cassette 16 directly, for example by an ink jet print head (not shown). If the film in the cassette 16 has a magnetic recording layer, for example APS film, the unique roll ID may be magnetically recorded on the magnetic recording layer of the film by the computer based ordering unit 36. The label 40 may also contain a magnetic strip that is machine readable, for recording the unique roll identification ID 42. A human readable version of the unique roll identification 42 may also be printed on the label 40 along with the magnetically coded version.

The number created by the computer based ordering station 36 is a unique number, consisting of at least two portions. In one embodiment, one portion contains the identification of the retail dealer location, the second portion contains a sequence number for customer films in that retail location. The label 40 may be affixed to the film cartridge, spool or cassette 16. The film is then collected for subsequent transport via transport service 18 to the photofinishing laboratory 20. If the customer-input information has been stored on a portable storage medium 35, the storage medium is also transported to the photofinishing laboratory at the same time. The central computer facility 38 may be physically located at the photofinishing laboratory 20, or at a remote location accessible electronically by the laboratory, for example via the internet.

Within the laboratory 20, an automated sorting device 48 that reads the machine-readable code from the label and sorts the film cassettes 16 (only one cassette is shown for simplicity) into batches that require similar services. The unique roll identification number on the label 40 allows the customer roll of film 16 to be paired with the requested information from either the portable storage medium 35 or the central computer facility 38 and sorting the film into the proper batches for the requested services. In an all digital lab, the films are not sorted prior to processing, but spliced onto a common reel, processed and sent to a film scanner (not shown). The film scanner would read the URID from the spliced tape, interrogate the central computer facility for service instructions, and then send the digital image files to the appropriate output devices such as digital printers.

At the time of splicing, the unique roll identification number (also called the URID) is read from the label 40 on the film cassette 16, and imprinted onto the splice tape 50 used to fasten the films into a continuous roll 24 for processing, for example by an ink jet print head or dot matrix printer. The customer films are developed in a processor 25 and the process films 27 are transported to printer 26 and other devices 28, 30 to provide the services requested. The URID is imprinted on the back of the requested prints using well-known photographic process surviving inks and printing equipment such as ink jet or dot matrix printers. When all services are available, the services and the processed films 27 are matched at a finishing station 32 where the requested services are reunited with the processed film 27. The URID 42 on the processed film and the services allows accurate sorting. The finishing station 52 creates an order return envelope 62 with the dealer and customer identification, cost information, etc. supplied from the central computer facility 38. The completed customer orders are then returned to the retail location 14. The use of the URID 42, generated by the computer based ordering station 36 at the retail location 14, eliminates the need for manual sorting used in conventional wholesale photofinishing operations, increases the reliability in fulfilling the requested services, and decreases the chance of losing customer rolls of films.

Figures 3, 4:
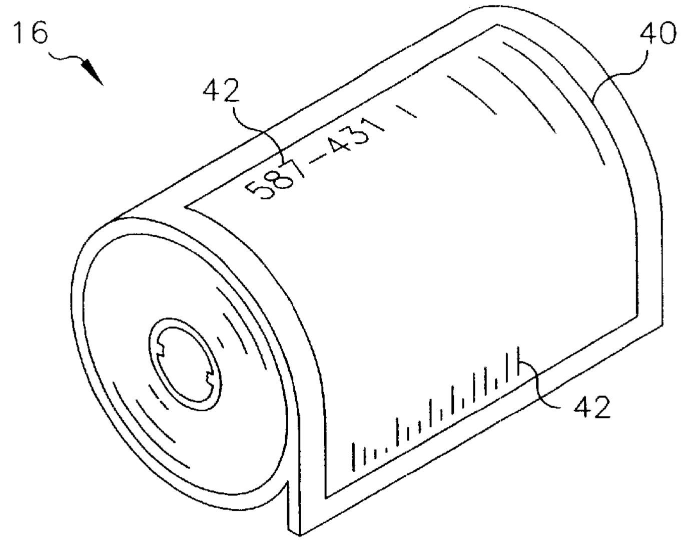
FIG. 3 shows a film cartridge bearing a label having a unique roll ID according to the present invention.
FIG. 4 shows a preferred format for the unique roll ID according to the present invention.

FIG. 3 shows a film cartridge 16 bearing a label 40 imprinted with the unique roll identification number (URID) 42 in both human and machine readable forms. Alternatively, the URID 42 may be in a font that is both human and machine readable. Referring to FIG. 4, the human readable and machine-readable URID 42 is generated at the retail dealer location and consists of at least two portions. In one embodiment, one portion 64 identifies the dealer while a second portion 66 is a sequence number within the dealer. In this embodiment, the sequence number 66 starts for example at 1 and increments in single digits up to a sufficiently large number such that the sequence number is not repeated within one week. Upon reaching the maximum sequence number, the sequence number 66 is re-initialized at 1 and the incrementing repeats. This scheme will prevent duplicate UFID's 42 in a photofinishing lab. The label 40 is either a partial label, leaving the machine-readable information preprinted on the cassette uncovered, or it may be a complete label. If the label completely covers the cassette 16, then the machine-readable information that was already on the cassette can be read and replicated on the label 40.

Figure 5:
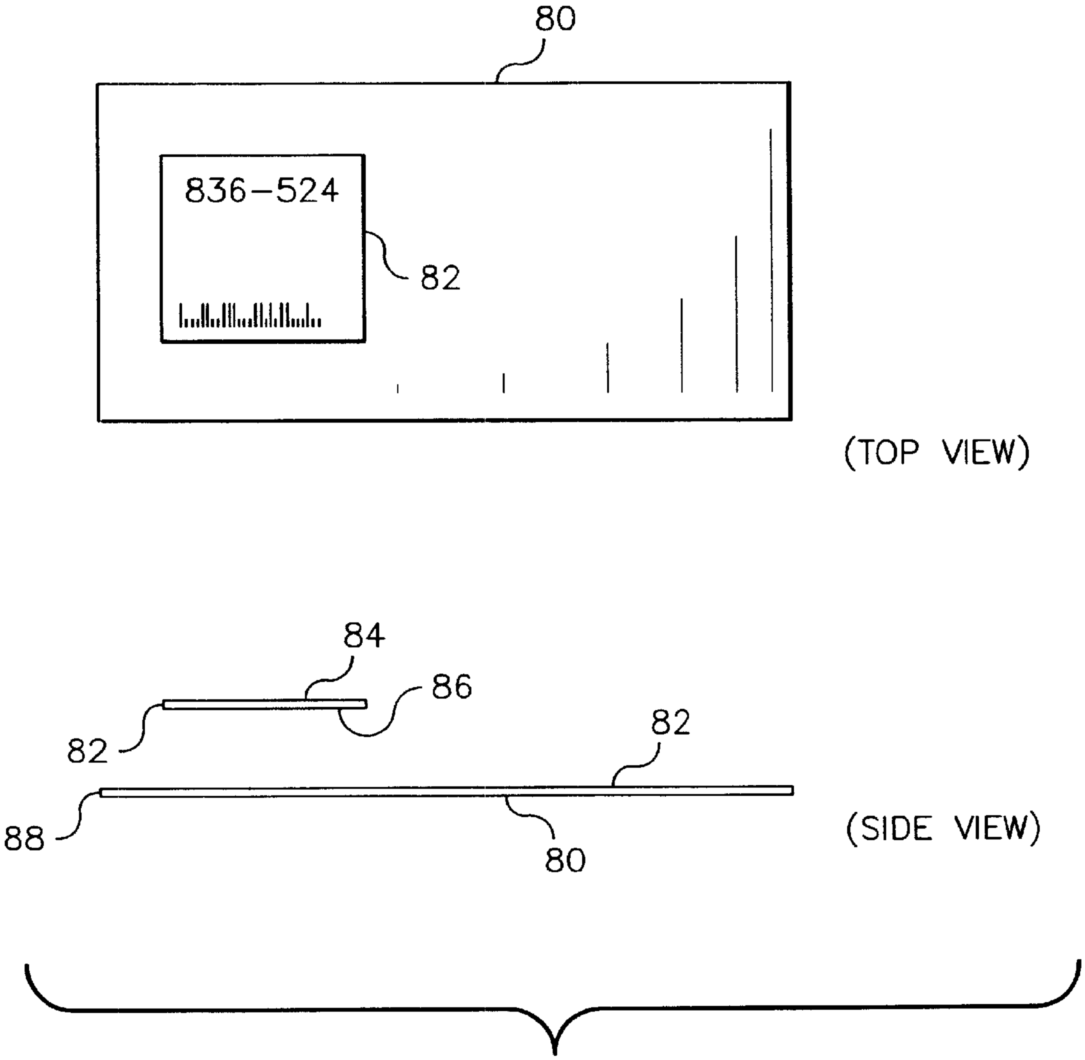
FIG. 5 shows a label according to the present invention for use with a one-time use camera.

FIG. 5 shows a label for use with one-time use cameras according to the present invention. The label 80 is generated by the computer based ordering station 36 at the retail location 14. In one embodiment, when the customer indicates the product is a one-time use camera instead of an individual roll of film, the computer-based ordering station 36 described in FIG. 2 generates a label consisting of two layers. The outer layer 82 contains the two-portion unique roll identification number 42 on surface 84 and an adhesive on the opposite surface 86. The second layer 88 contains an adhesive on the lower surface 90 and a release surface 92. The customer applies the two-part label to the one-time use camera. When the one-time-use camera arrives in the photofinishing laboratory 20, the roll of film is removed from the one-time use camera, and the outer layer 82 is removed from the second layer 88 of label 80 and affixed to the roll of film by the laboratory personnel. The roll of film 16 then follows the workflow described in FIG. 2.

The invention has been described in detail with particular reference to certain preferred embodiments thereof, but it will be understood that variations and modifications can be effected within the spirit and scope of the invention.

PARTS LIST

10 customer
12 photofinishing envelope
14 retail location
16 roll of film
18 transportation service provider
20 photofinishing laboratory
22 manual sorting location
24 reel of spliced film
25 film processor
26 printer
27 processed film reels
28 output device
30 other output device
32 finishing station
34 completed customer order
35 portable storage medium
36 computer-based ordering station
38 central computer facility
40 label

42 machine readable roll identification number
48 automated sorting device
50 splice tape
52 finishing station
62 order return envelope
64 dealer ID
66 sequence number
80 one time use camera label
82 outer layer
84 outer surface of outer layer
86 opposite surface
88 second layer
90 lower surface of second layer
92 release surface of second layer

What is claimed is:

1. A method of photofinishing, comprising the steps of:

a) generating a unique roll ID number for a roll of photographic film to be finished, the ID number being generated at a retail ordering station and including one portion containing an identification of a retailer dealer location and a second portion containing a sequence number for customer films in that retail location;

b) recording customer order information for the roll of film;

c) associating the customer order information with the unique roll ID number in a central computer facility;

d) marking the roll of film with a machine readable version of the unique roll ID number; and e) reading the roll ID number on the roll of film, and accessing the customer order information from the central computer facility to control a photofinishing operation, whereby the roll of film can be transported to a photofinishing laboratory without the use of an envelope bearing customer order information.

2. The method claimed in claim 1, wherein the customer order in formation includes photofinishing instructions and the photofinishing operation is a sorting and batching operation.

3. The method claimed in claim 1, wherein the roll of film is marked by affixing an adhesive label to the film cassette.

4. The method claimed in claim 3, wherein the label includes a magnetically encoded version of the roll ID.

5. The method claimed in claim 3, wherein the label includes an optically machine readable version of the roll ID.

6. The method claimed in claim 4, wherein the label applied to a one-time-use camera is a two part label comprising a peel off portion subsequently applied to the roll of film contained within the one-time-use camera.

7. The method claimed in claim 1, wherein the roll of film is marked by printing the roll ID on the film cassette.

8. The method claimed in claim 1, wherein the central order facility is located at the photofinishing laboratory.

9. The method claimed in claim 1, wherein the roll of film is marked by recording the roll ID on a magnetic layer on the film.

10. The method claimed in claim 1, further comprising the step of transporting the roll of film to a photofinishing laboratory without the use of individual film envelopes.

11. The method claimed in claim 1, wherein the customer order information is stored on a portable storage medium and the portable storage medium is transported to a photofinishing laboratory along with rolls of film for processing, and the customer order information is sent to the central computer facility by the photofinishing laboratory.

12. The method claimed in claim 1, wherein the customer order information along with the associated roll ID is electronically transmitted to the central computer facility from a remote dealer location.

13. The method claimed in claim 1, wherein the customer order information includes photofinishing instructions and the photofinishing operation is a digital output creation step that is controlled by the photofinishing instructions.

14. The method claimed in claim 1, wherein the photofinishing laboratory is an all digital laboratory, and the photofinishing operation is a scanning and digital printing operation.

15. A system for performing a photofinishing operation, comprising:

a) a computer based ordering station located at a retail location for generating a unique roll ID number for a roll of photographic film to be finished, the ID number being generated at a retail ordering station and including one portion containing an identification of a retailer dealer location and a second portion containing a sequence number for customer films in that retail location, and affixng the unique roll ID to a roll of film, recording customer order information for the roll of film, and associating the customer order information with the unique roll ID number;

b) a central computer facility for storing the unique roll ID and associated customer order information;

c) means for transporting the roll of film from the retail location to a photofinishing laboratory; and d) a reader located at the photofinishing laboratory for reading the roll ID number on the roll of film, and accessing the customer order information from the central computer facility to control a photofinishing operation, whereby the roll of film can be transported to a photofinishing laboratory without the use of an envelope bearing customer order information.

16. The system claimed in claim 15, wherein the customer order information includes photofinishing instructions and the photofinishing operation is a sorting and batching operation.

17. The system claimed in claim 15, wherein the roll of film is marked by affixing an adhesive label to the film cassette.

18. The system claimed in claim 17, wherein the label includes a magnetically encoded version of the roll ID.

19. The system claimed in claim 17, wherein the label includes an optically machine readable version of the roll ID.

20. The system claimed in claim 17, wherein the label applied to a one-time-use camera is a two part label comprising a peel off portion subsequently applied to the roll of film contained within the one-time-use camera.

21. The system claimed in claim 15, wherein the roll of film is marked by printing the roll ID on the film cassette.

22. The system claimed in claim 15, wherein the central order facility is located at the photofinishing laboratory.

23. The system claimed in claim 15, wherein the roll of film is marked by recording the roll ID on a magnetic layer on the film.

24. The system claimed in claim 15, wherein the customer order information is stored on a portable storage medium and the portable storage medium is transported to a photo finishing laboratory along with rolls of film for processing, and the customer order information is sent to the central computer facility by the photofinishing laboratory.

25. The system claimed in claim 15, wherein the customer order information along with the associated roll ID is electronically transmitted to the central computer facility from a remote dealer location.

26. The system claimed in claim 15, wherein the customer order information includes photofinishing instructions and the photofinishing laboratory includes means for creating a digital output that is controlled by the photofinishing instructions.

27. The system claimed in claim 15 wherein the photofinishing laboratory is an all digital laboratory having a scanner and a digital printer, and the photofinishing operation is a digital printing operation.

* * * * *